June 26, 1962  E. G. HAMWAY ETAL  3,041,193
METHOD OF MAKING SUEDE-LIKE PLASTIC SHEETING
Filed Aug. 29, 1957  2 Sheets-Sheet 1
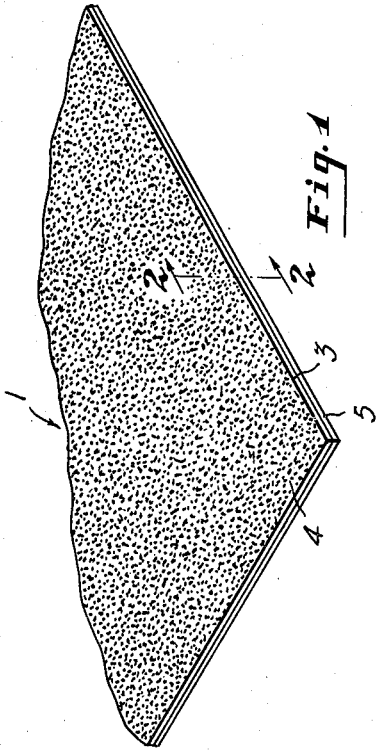
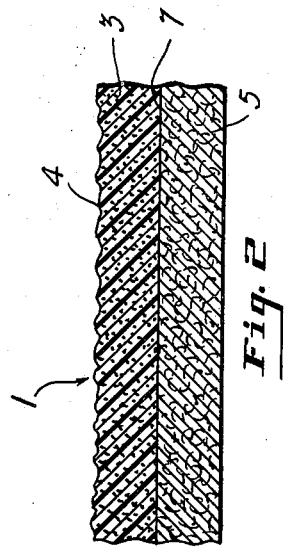
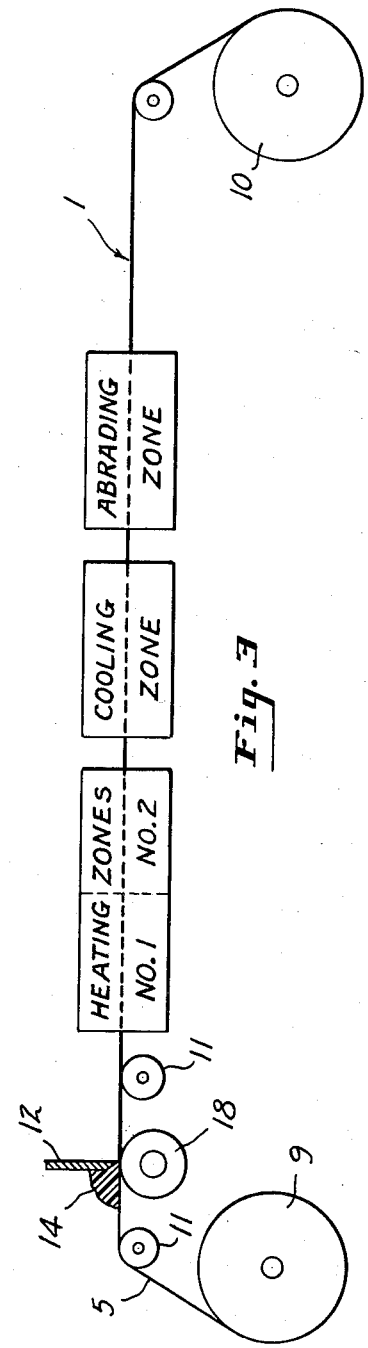
INVENTORS
*Edward G. Hamway*
*Bernard Edwards*
BY
ATTORNEYS

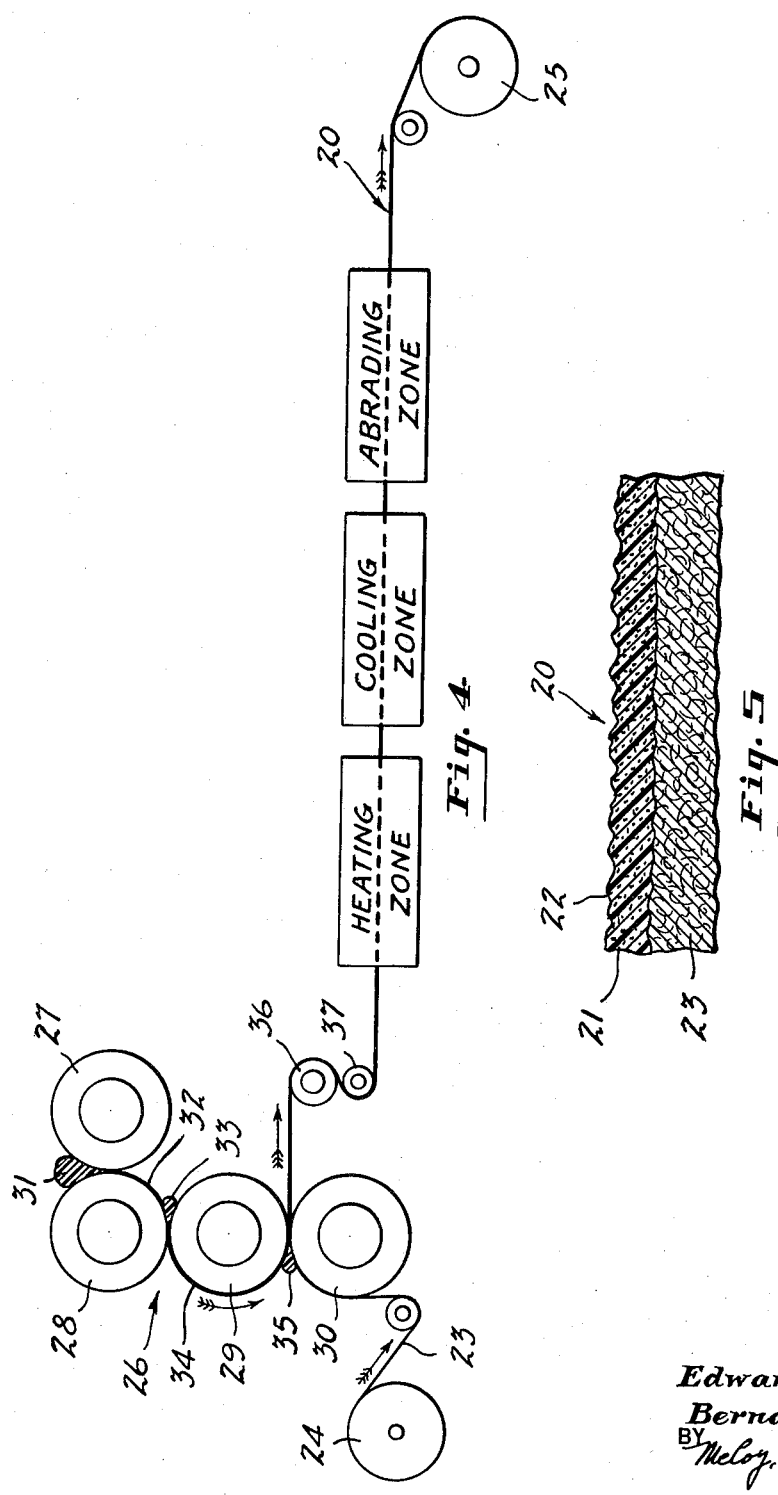

United States Patent Office 3,041,193
Patented June 26, 1962

3,041,193
METHOD OF MAKING SUEDE-LIKE PLASTIC SHEETING
Edward G. Hamway and Bernard Edwards, Toledo, Ohio, assignors to The General Tire & Rubber Company, Akron, Ohio, a corporation of Ohio
Filed Aug. 29, 1957, Ser. No. 681,077
11 Claims. (Cl. 117—11)

This invention relates to a process of forming a suede-like surface on fused supported plastic sheeting and to an article made by said process.

The surface of plastic sheeting, such as polyvinyl chloride sheeting, is smooth and shiny. Surfaces with different properties such as appearance, feel and texture are sometimes desirable for decorative and utilitarian purposes. In the past, attempts to make a polyvinyl base sheeting with a suede-like surface have not been too successful and have resulted in expensive, unattractive and relatively poor products. One method tried has been to heat soften a calendered supported polyvinyl chloride sheet, and press its surface with a roll having a sandpaper face by means of a 2-roll calender. The first few revolutions produced a surface that was somewhat suede-like but the remainder of the surface continually changed giving a non-uniform and unsatisfactory product. Another disadvantage of this method is the fact that the surface of the product is harsh to the touch and has poor appearance. Another method of preparing suede polyvinyl chloride is to coat sandpaper with a vinyl layer and strip off the sandpaper. The resultant layer also has a harsh feel.

It is an object of the present invention to provide an inexpensive process for forming an attractive suede-like surface on fused supported plastic sheeting.

It is also an object to produce a porous layer of a polyvinyl base composition which has an attractive suede-like surface.

Reference should be had to the accompanying drawing forming a part of this specification in which:

FIGURE 1 is a perspective view of plastic sheeting having a roughened suede-like surface prepared according to the present invention;

FIGURE 2 is a fragmentary sectional view taken along the line indicated at 2—2 in FIG. 1 and shown on an enlarged scale;

FIGURE 3 is a schematic diagram showing a method of making the suede-like plastic sheeting of the present invention;

FIGURE 4 is a schematic diagram showing another method of making the suede-like plastic sheeting and apparatus used therein, and;

FIGURE 5 is a fragmentary sectional view of a supported suede-like plastic sheeting according to the present invention.

In accordance with the present invention, laminated plastic sheeting 1 is shown comprising an upper layer 3 of cellular polyvinyl chloride having an attractive suede-like surface 4 and preferably a lower layer 5 of a supporting material having a surface 7 to which the polyvinyl chloride layer is fused. The plastic sheeting may be made by casting a plastisol composition comprising polyvinyl particles, a blowing agent, and a suitable liquid plasticizer on surface 7 of the fibrous backing material layer 4 to form a coating layer thereon. Then the plastisol layer is heated both to cause release of gas by the blowing agent and to cause fusion of the polyvinyl resin. The release of gas and fusion of the resin are coordinated as hereafter described so as to form a cellular flexible polyvinyl layer over the backing. The polyvinyl layer is cooled or allowed to cool after its expansion. The surface of the cellular plastic layer is ground thereafter, preferably by abrading to form a suede-like finish thereon.

The resultant plastic sheeting is inexpensive and attractive and has some important advantages over suede leather such as being washable and generally having better abrasion resistance. Other advantages of the suede-like articles of polyvinyl base compositions are that they can be made in a wide range of colors, the colors will not crock when rubbed with fabric, and they are relatively easily embossed.

One method of making the plastic sheeting with a suede-like appearance is shown in FIG. 3. The sheeting may be prepared in a continuous process in which the fibrous backing material is unwound from a feed roll 9 and the finished sheeting wound on a take-up roll 10. The fibrous backing is conveyed in a continuous manner along rollers 11 and is carried past a doctor knife 12 which spreads a pool 14 of plastisol on surface 7 of the backing to form a coating thereon. The thickness of the plastisol coating may be controlled by means of a roller 18 substantially directly underneath the doctor knife. When a roller is not used underneath the knife, the thickness of the coating may be controlled by the tension of the belt and the angle of the knife.

If desired, the sheeting may be formed by fusing a cellular polyvinyl layer on the backing as above described so that the coating becomes integral with the fabric backing which imparts some superior physical characteristics thereto in a laminated sheet.

The supporting material may be coated by other methods, as for example by the floating knife method, by calendering, by cast coating, and by roller coating. The polyvinyl chloride layer can be fused at a temperature below the decomposition point of the blowing agent, rolled up for storage, and later subjected to a high temperature to form a foamed layer.

As shown in FIG. 3, the plastisol coated fabric is heated to decompose the blowing agent, which in turn releases gas. The heating step also fuses and gels the plastisol. We have found that the temperature at which the gas is released from the blowing agent is important in determining whether the sponge or foam is of the closed or open cell type. Generally, if the gas is released below the gel and fusion temperature of the plastisol where the material has low strength, the pores rupture and open cell structure is obtained. If, on the other hand, the gas is released above the fusion temperatures where the material is relatively strong, generally most of the pores do not rupture and a closed cell structure is produced in the sponge layer.

In one method of producing a porous suede-like layer, as shown in FIG. 3, the plastisol-coated fabric is fed into a heating unit which preferably is two-staged, having a first heating zone of a temperature of preferably about 200° to 350° F., and a second heating zone of about 300° to 500° F., which is above the fusion and gelling temperature of the polyvinyl resin. The plastisol coating is converted into a cellular polyvinyl chloride layer and fused to the fibrous backing in the heating unit. The heating step may be accomplished by conversion ovens, by strip heaters, by dielectric heating, and by other methods well known in the art. Thereafter, the sheeting is cooled and abraded, preferably by a precision surface abrader such as one similar to a conventional leather sueder to form a desirable porous suede-like surface on the supported plastic sheeting. Other precision surface abraders or grinders are suitable, such as those having high speed wheels, drums, or belts in which the surface is ground by means of an abrasive material such as sandpaper, emery cloth, and silicon carbide or the like.

Another method of making plastic sheeting with a suede-like appearance is shown in FIG. 4 in which the supporting material is coated with a polyvinyl chloride layer by calendering. A laminated plastic sheeting 20 is shown in FIG. 5 which comprises a porous upper layer 21 of cellular polyvinyl chloride having an attractive suede-like surface 22 and a lower supporting layer 23 of a cotton fabric. Again, as shown in FIG. 4, the sheeting may be prepared in a continuous manner in which the supporting material 23 is unwound from a feed roll 24 and wound on a take-up roll 25. The supporting material is conducted along roller 21 over to a 4-roll inverted L calender 26 which comprises a stack of heated rolls 27, 28, 29 and 30. A suitable unfused polyvinyl chloride resin composition powder blended with plasticizer, blowing agent, stabilizer, etc., is supplied to the nip of the rolls 27 and 28 so as to maintain a rolling bank 31 of polyvinyl chloride resin composition therein. The bank of polyvinyl base composition is generally previously processed in a ribbon mixer and thereafter mixed on a hot roll at a temperature preferably of about 250° to 350° F. to obtain a homogeneous composition containing a continuous phase of polyvinyl chloride particles, a plasticizer, a blowing agent and other fillers and additives.

A suitable polyvinyl resin for use in coating by calendering is a blotter type resin in which the particles are relatively small (preferably less than about 100 mesh) and are exploded or blown up to provide a large amount of surface area. The resin particles have good plasticizer take-up properties due to the high surface area and absorb large amounts of plasticizer even at room temperature so strongly that plasticizer is not separable by centrifuging.

The film or sheet produced in the nip of the rolls 27 and 28 follows around the roll 28 at 32 to the nip of the roll 28 with roll 29 forming a bank 33 of resin. The sheet is reduced in that nip and follows around the roll 29 at 34 to the nip of the roll 29 with the roll 30 forming a bank of resin where it is united with the supporting material 23. The coated supporting material is carried along rollers 36 and 37 into a heating unit where the heat decomposes the blowing agent which in turn releases gas to form a porous cellular layer. After leaving the heating zone, the sheeting is conducted through a cooling zone and into an abrading zone where a precision surface abrader grinds the surface of the layer away to produce a porous suede-like layer.

The blowing agent of the present invention may be any of those inflating agents commonly used for making rubbery sponges p,p'-oxybis-benzene sulfonyl hydrazide, naphthalene-1,5-disulfonyl hydrazide, diazominobenzene, azodicarbonamide, biuret, di-n-nitrosopentamethylenetetramine, and N,N'-dimethyl N,N'-dinitrose terephthalamide. Generally, nitrogen evolving compounds which decompose at about 160° to 200° C. are preferred.

Other suitable blowing agents are those which release carbon dioxide such as sodium carbonate, ammonium carbonate, and ammonium bicarbonate.

Blowing agents having a decomposition below about 230° F. are preferred for producing predominantly open-celled sponge layers which form breathable laminates with the backing. Blowing agents giving off gas at temperatures above 230° F. are preferred when the sponge to be produced is of the closed cell type. When closed cell sponge is to be produced generally a heating oven is used with a temperature of about 230° F. to 500° F. The heating at this temperature decomposes the blowing agent and gels and fuses the plastic so that it is formed into a unitary mass. Generally, the polyvinyl resin compositions do not have sharply defined softening points and their fusing states extend over a temperature range and vary with different base compositions. The temperature ranges contemplated by this invention are from about 180° F. to 300° or 400° F. depending upon the particular composition and the length of time it is exposed to the temperature.

The surfaces of both the open-celled and closed-cell sponge layers are ground by buffing or abrading to secure the benefits of this invention, i.e. a suede surface material. The buffing or grinding of the outer surface preferably is accomplished by a surface abrader which will provide a uniformly roughened surface having upstanding relatively jagged protruding land portions.

A cooling step may be performed before abrading by any suitable means such as cooling cans.

The resin used in the plastic layer 3 preferably is polyvinyl chloride, polyvinylidene chloride, vinyl chloride-vinyl acetate copolymers, vinylchloride-vinylidene chloride copolymers, and mixtures of the above. Other suitable polymers are copolymers of vinyl chloride or other vinyl halides with monomers such as vinyl acetate, vinylidene chloride diethyl maleate, and vinyl-acetals such as vinyl butyral chloride in which the vinyl chloride component of the resinous copolymer usually is about 85 to 95 percent by weight. The above copolymers may also be formed with relatively small amounts, say 1–5 percent by weight, of another polymerizable material such as maleic acid.

Suitable plasticizers for the above class of resins are monomeric plasticizers of which high boiling esters, ketones, and ethers are preferred such as dioctyl phthalate, dioctyl sebacate, dibutyl phthalate, tricresyl phosphate and hydrofurfural esters, ethers, and ketones. Other suitable plasticizers are adipates, azelates, benzoates, citrates, oleates, phosphates, phthalates, ricinoleates, sebacates, stearates, epoxies, and hydrocarbons.

Some of the plasticizer may be of the polymeric type. Some examples are long chain linear polyesters of which polyesters of an alkylene glycol and a dicarboxylic acid such as polyethylene-propylene glycol sebacate and Paraplex G–60 (a high molecular weight alkyd resin) are suitable. Another suitable long chain polyester is Paraplex G–25 (polypropylene ether glycol-sebacate) which is sold by Resinous Products and Chemical Corp. and is a soft, viscous alkyd resin having a specific gravity of 1.06 and an acid number of not more than 2.0; also, it is soluble in esters, ketones, aromatic and chlorinated hydrocarbons. Polymeric plasticizers such as those which are copolymers of a conjugated diolefin having less than 7 carbon atoms, such as butadiene, and a copolymerizable monomer such as acrylonitrile or methyl isopropenyl ketone may also be present.

Other compounding ingredients such as additives and fillers which are well known in the art may be used in the polyvinyl base compositions. Other suitable additives are heat and light stabilizers, waxes, flame retardants, bodying agents, accelerators, lubricants, colors and volatile solvents.

The thickness of the cellular layer formed by the above-mentioned resin and plasticizer is preferably about 0.005 to 0.05 inch although it may be less than 0.005 and as great as .1 to .2 inch, or even 1 to 2 inches or more.

The thickness of the backing when used is not critical and generally the thickness preferred for flexible coverings and the like is about .005 to 0.1 inch.

Examples of suitable fibrous backing materials are cotton fabric, rayon fabric, felt, paper, and a rayon fabric mixture with a high strength synthetic fiber such as nylon or Dacron. A suitable supporting material may be glass fibers, kraft paper, crepe paper, rubber saturated paper or flannels, or a release paper which may be a wax-coated paper for easy stripping from the foam layer once it is made. A suitable fabric backing is described in the copending application of De Forest Lott and Edward Hamway, Serial No. 509,650, filed May 19, 1955, and now U.S. Patent No. 2,875,115. The material therein described is a non-woven compressed material fabric comprising at least 35% by weight of fiber content of nylon, Dacron, and/or Orlon fibers, and about at least 15 percent and up to 50 percent by weight of rayon. The fibers are bound together by at least 35% of the fiber weight by a rubbery copolymer binder. The resultant fabric has stretch and good tear in both directions.

The following examples are illustrative of the process of the present invention.

EXAMPLE I

Three separate plastisols A, B, and C, respectively, were made as shown in the following table:

Table I

| Ingredients | Parts by Weight | | |
|---|---|---|---|
| | A | B | C |
| Polyvinyl resin | 100 | 100 | 100 |
| Plasticizer: | | | |
| Monomeric (di 2-ethyl hexyl phthalate) | 113 | 50 | 60 |
| Santicizer 160 (butyl benzyl phthalate) | | | 20 |
| Polymeric (Paraplex G-60, a high molecular weight liquid polyester) | | 50 | |
| Blowing Agent: | | | |
| p,p'-oxybis-benzene sulfonyl hydrazide | 3.5 | | |
| azodicarbonamide | | | 1.5 |
| N,N'-dimethyl N,N'-dinitroso terephthalamide | | 5 | |
| Other additives: | | | |
| Filler (Calcium carbonate) | 20 | | |
| Acrawax C (hard light synthetic wax) | 2.7 | | |
| Zinc oxide | | 2.5 | |
| Dibasic lead phosphite | | | 1 |
| Dibasic lead phthalate | | | 3 |
| Pigment | 2-20 | 2-20 | 2-20 |

Each of the compositions designated as "B" and "C" was premixed and ground on a 3-roll mill until a smooth homogeneous dispersion resulted which was of a spreadable viscous consistency. Composition "A" was also mixed to form a relatively homogeneous dispersion. The plastisol compositions were then spread upon a 0.025 inch thick fibrous backing layer 5 of cotton fabric backing by means of a doctor blade 12 used in a continuous process in which a feed roll 9 and a take-up roll 10 were used to convey the fabric continuously past the doctor knife. Each of the composite articles made from compositions designated "A" and "C" were passed through an oven and heated to a temperature between 250° to 400° F. so that the resinous material was fused and the blowing agent decomposed to release gas to form a flexible 0.03 inch thick cellular layer which is comprised substantially of closed cells over the fabric. Thereafter, the exposed surfaces of each cellular layer formed from compositions "A" and "C" were cooled by passing over cooling cans. The surfaces were then abraded so as to produce a very pleasing suede-like finish. The ground surfaces examined microscopically are found to comprise a multiplicity of irregular upstanding land portions or ridges surrounded by larger or undercut void portions. The small minute undercut or void portions or indentations are evenly distributed so as to produce a uniformly pitted surface that has the entire appearance and feel of high grade suede leather.

After the composition designated as "B" was spread on the cotton fabric, the composite article was heated in a continuous process by passing through a two-stage oven in which the first-stage temperature was about 200° to 230° F. and the second-stage temperature was about 300° to 500° F. A substantially open-celled sponge layer was formed since the heat of the first stage was sufficient to decompose the blowing agent and release gas, but not enough to fuse the resin so as to entrap the gas within the layer. The second stage temperature was high enough to fuse and soften the polymer but the major portion of the blowing agent had already decomposed so that it could not be retained or entrapped in the resin. The resultant cellular layer was of the open-celled type in which there is communication between the cells. The resultant article had an attractive surface of impervious appearance, but the article is breathable. When smoke is blown into one side of the coating, the smoke passes through the layers by way of the open-celled structure. When the surface was ground, a suede-like surface was formed on the breathable sheeting.

Generally, breathable properties are desirable in plastic sheeting used as upholstery covering, garment materials, or shoe uppers. The suede plastic products of the present invention have many uses such as the above as well as handbags and automotive interiors, such as side panels, head-liners, and crash pads.

The porous suede-like plastic layer of the present invention may be dyed and/or printed to produce attractive designs on the suede surface. Embossed suede vinyl articles have outstanding surface texture properties over conventional vinyl plastic articles. Variations in surface texture and feel may be obtained by embossing the suede-like layers without losing the overall suede appearance or softness to the sense of touch.

It has also been found that closed-cell foam layer of a polyvinyl base composition can be made breathable by perforating a supported foam layer from the back to the face with pins that are preferably heated. This perforating operation, in which no material is removed from the layer as in a "punch-perforating" operation, preferably is performed before the surface is ground. After grinding the cellular plastic layer, which exposes the cells and raises the nap of the surface, the porous nature and suede-like texture of the surface hides and masks the perforations.

It is to be understood that in accordance with the provisions of the patent statutes, the particular form of product shown and described and the particular procedure set forth are presented for purposes of explanation and illustration, and that various modifications of said product and procedure can be made without departing from our invention.

Having described our invention, we claim:

1. A method of producing a porous suede-like layer on a fibrous supporting material consisting essentially of the steps of applying as a coating to a surface of the material a liquid polyvinyl halide composition consisting, except for compounding ingredients, essentially of particles of a polyvinyl halide resin selected from the group consisting of polyvinyl chloride resins, polyvinylidene chloride resins, vinyl chloride-vinyl acetate copolymer resins, vinyl chloride-vinylidene chloride copolymer resins, vinyl chloride-diethyl maleate copolymer resins and polyvinyl butyral chloride resins, a plasticizer for the resin and a blowing agent, heating the composition to cause release of gas by the blowing agent and fusion of the resin particles with the plasticizer to form a flexible cellular layer over the material, cooling the layer below its fusion temperature and thereafter abrading the exposed surface of the layer to produce thereon a suede-like finish free of fibrous particles.

2. A method of producing a porous suede-like layer on a fibrous supporting material consisting essentially of the steps of applying to a surface of the material a liquid polyvinyl halide composition consisting, except for compounding ingredients, essentially of discrete particles of a polyvinyl chloride resin, a plasticizer therefor and a blowing agent, heating said composition to cause release of gas by the blowing agent and fusion of the resin particles with the plasticizer to form a flexible cellular layer over the material, cooling the layer below its fusion temperature and abrading the exposed surface of the layer to produce thereon a suede-like finish free of fibrous particles.

3. A method of producing a porous suede-like layer on a fibrous supporting material consisting essentially of the steps of applying as a coating to a surface of the material a liquid polyvinyl halide composition consisting, except for compounding ingredients, essentially of a polyvinyl chloride resin, a high boiling liquid plasticizer for the resin and a nitrogen-gas-producing blowing agent, heating the composition to cause release of nitrogen gas by the blowing agent and fusion of the resin with the plasticizer to form a flexible cellular layer over the material, cooling the layer below its fusion temperature and abrading the exposed surface of the layer to produce thereon a suede-like finish free of fibrous particles.

4. A method of producing a porous suede-like layer on a fibrous supporting material consisting essentially of the steps of applying as a coating to a surface of the material a liquid polyvinyl halide composition consisting, except for compounding ingredients, essentially of particles of a vinyl-chloride-vinyl acetate copolymer resin, a high boiling liquid ester plasticizer for the resin and a blowing agent, heating the composition to cause release of gas by the blowing agent and fusion of the resin with the plasticizer to form a flexible cellular layer over the material, cooling the layer below its fusion temperature and abrading the exposed surface of the layer to produce thereon a suede-like finish free of fibrous particles.

5. A method of producing a porous suede-like layer on a fibrous supporting material consisting essentially of the steps of applying as a coating to a surface of the material a liquid polyvinyl halide composition consisting, except for compounding ingredients, essentially of a vinyl chloride-diethyl maleate copolymer resin, a plasticizer therefor and a blowing agent, heating the composition to cause release of gas by the blowing agent and fusion of the resin with the plasticizer to form a flexible cellular layer over the material, cooling the layer below its fusion temperature and abrading the exposed surface of the layer to produce thereon a suede-like finish free of fibrous particles.

6. A method of producing a porous suede-like layer on a fibrous supporting material consisting essentially of the steps of applying as a coating to a surface of the material a plastisol consisting, except for compounding ingredients, essentially of particles of a vinyl halide resin selected from the group consisting of polyvinyl chloride resins, polyvinylidene chloride resins, vinyl chloride-vinyl acetate copolymer resins, vinyl chloride-vinylidene chloride copolymer resins, vinyl chloride-diethyl maleate copolymer resins and polyvinyl butyral chloride resins, a plasticizer for the resin and a blowing agent which releases gas below the fusion point of the plastisol, heating the plastisol sufficiently to cause release of gas by said blowing agent but insufficiently to fuse the resin particles, after substantial release of gas heating the resulting porous plastisol above its fusion temperature to form a flexible cellular layer over the material, cooling the layer below its fusion temperature and abrading the exposed surface of the layer to produce thereon a suede-like finish free of fibrous particles.

7. A method of producing a closed-cell, porous suede-like layer on a fabric backing consisting essentially of forming on a surface of the backing a fused layer consisting, except for compounding ingredients, essentially of plasticized polyvinyl chloride resin containing a blowing agent, heating the layer above its fusion temperature and sufficiently high to cause release of gas by the blowing agent to form a flexible cellular layer over the backing, cooling the layer below its fusion temperature and abrading the exposed surface of the layer to produce thereon a suede-like finish free of fibrous particles.

8. A method of producing a flexible, cellular layer of polyvinyl chloride resin on a fabric backing which comprises coating the backing by calendering thereon a thin coherent film of a polyvinyl halide composition consisting essentially of a continuous phase of a polyvinyl chloride resin containing a plasticizer and a nitrogen-gas-producing blowing agent capable of releasing gas at a temperature between 160° C. and 200° C., the composition during calendering being at a temperature between 250° F. and 350° F. but below the gas releasing temperature of the blowing agent, heating the coated backing above the gas releasing temperature of the blowing agent but below 500° F. without rupturing the film coating and cooling the coated backing.

9. The method of claim 8 wherein the blowing agent is azodicarbonamide.

10. A sheet comprising a uniform layer of a solid fused plasticized polyvinyl chloride resin closed-cell foam supported by a layer of fibrous material attached integrally and directly thereto, said layer of foam having an abraded fiber-free outer surface exposing a section through fine uniform cells of the foam.

11. A sheet comprising a uniform layer of a solid fused plasticized polyvinyl halide resin closed-cell foam supported by a layer of fibrous material attached integrally and directly thereto, said layer of foam having an abraded fiber-free outer surface exposing a section through fine uniform cells of the foam, the resin being selected from the group consisting of polyvinyl chloride resins, polyvinylidene chloride resins, vinyl chloride-vinyl acetate copolymer resins, vinyl chloride-vinylidene chloride copolymer resins, vinyl chloride-diethyl maleate copolymer resins and polyvinyl butyral chloride resins.

References Cited in the file of this patent

UNITED STATES PATENTS

| | | |
|---|---|---|
| 1,713,746 | Dennison | May 21, 1929 |
| 2,579,044 | Kober | Dec. 18, 1951 |
| 2,739,950 | Nelson | Mar. 27, 1956 |
| 2,811,464 | Strehl et al. | Oct. 29, 1957 |
| 2,837,440 | Boivin | June 3, 1958 |
| 2,917,472 | Smith | Dec. 15, 1959 |
| 2,920,977 | Adams | Jan. 12, 1960 |

FOREIGN PATENTS

| | | |
|---|---|---|
| 684,708 | Great Britain | Dec. 24, 1952 |